(12) United States Patent
Bettiol et al.

(10) Patent No.: US 7,464,738 B2
(45) Date of Patent: Dec. 16, 2008

(54) TYRE FOR A VEHICLE WHEEL INCLUDING ZIGZAG CIRCUMFERENTIAL GROOVES AND BLIND TRANSVERSE CUTS

(75) Inventors: Flavio Junior Bettiol, Sao Paolo (BR); Luigi Campana, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 90 days.

(21) Appl. No.: 10/148,593

(22) PCT Filed: Nov. 30, 2000

(86) PCT No.: PCT/EP00/11986

§ 371 (c)(1), (2), (4) Date: Oct. 11, 2002

(87) PCT Pub. No.: WO01/39993

PCT Pub. Date: Jun. 7, 2001

(65) Prior Publication Data
US 2003/0094227 A1   May 22, 2003

Related U.S. Application Data
(60) Provisional application No. 60/176,812, filed on Jan. 19, 2000.

(30) Foreign Application Priority Data
Dec. 1, 1999   (EP) .................................. 99830749

(51) Int. Cl.
*B60C 11/04* (2006.01)
(52) U.S. Cl. .............................. 152/209.2; 152/209.16; 152/209.18; 152/209.26; 152/900; 152/DIG. 3
(58) Field of Classification Search .............. 152/209.1, 152/209.2, 209.18, 209.26, 900, DIG. 3, 152/209.16
See application file for complete search history.

(56) References Cited

U.S. PATENT DOCUMENTS
2,068,050 A * 1/1937 Bishop ....................... 152/900

(Continued)

FOREIGN PATENT DOCUMENTS
DE   2536470   * 2/1977

(Continued)

OTHER PUBLICATIONS
Translation for Japan 01-282005.*

(Continued)

*Primary Examiner*—Steven D Maki
(74) *Attorney, Agent, or Firm*—Finnegan, Henderson, Farabow, Garrett & Dunner, L.L.P.

(57) ABSTRACT

A tire for a wheel of a vehicle includes a carcass, a belt structure, and a tread. The tread pattern includes at least two circumferential grooves and at least three circumferential ribs. The grooves include a zigzag configuration and a shape repeated according to a circumferential pitch. Within a single pitch, each groove includes at least two directions different from a circumferential direction of the tire, generating at least two ground-gripping fronts in each of two rotation directions of the tire, and at least one blind transverse cut extending from opposite sides of the groove, generating a third ground-gripping front. Ends of the blind transverse cuts are positioned on planes parallel to each other and to an equatorial plane of the tire. The first plane and the second plane delimit a continuous portion of at least one of the circumferential ribs. The continuous portion includes a constant axial width.

29 Claims, 4 Drawing Sheets

U.S. PATENT DOCUMENTS

| | | | | |
|---|---|---|---|---|
| 2,779,378 A | * | 1/1957 | Robertson | 152/900 |
| 2,808,867 A | * | 10/1957 | Buddenhagen et al. | 152/209.2 |
| 3,550,665 A | * | 12/1970 | Verdier | 152/209.18 |
| 3,556,191 A | * | 1/1971 | Mills | 152/900 |
| 3,682,220 A | * | 8/1972 | Verdier | 152/900 |
| 3,841,374 A | | 10/1974 | Boileau | |
| 3,858,633 A | | 1/1975 | Boileau | |
| 3,897,813 A | * | 8/1975 | Verdier | 152/900 |
| 4,271,886 A | * | 6/1981 | Bachmann et al. | 152/900 |
| 4,284,115 A | * | 8/1981 | Ohnishi | 152/900 |
| 4,550,756 A | | 11/1985 | Hinkel | |

FOREIGN PATENT DOCUMENTS

| | | | |
|---|---|---|---|
| EP | 0 369 932 | | 5/1990 |
| EP | 0 384 182 | | 8/1990 |
| EP | 0 578 216 | | 1/1994 |
| EP | 602989 | * | 6/1994 |
| JP | 60-25806 | * | 2/1985 |
| JP | 1-282005 | * | 11/1989 |

OTHER PUBLICATIONS

Toru; "Low Noise Rib Tire"; Patent Abstracts of Japan, of JP 05-338411 A, Dec. 21, 1993.

* cited by examiner

TYRE FOR A VEHICLE WHEEL INCLUDING ZIGZAG CIRCUMFERENTIAL GROOVES AND BLIND TRANSVERSE CUTS

CROSS-REFERENCE TO RELATED APPLICATIONS

This application is a national stage entry under 35 U.S.C. §371 from International Application No. PCT/EPOO/11986, filed Nov. 30, 2000, in the European Patent Office, the contents of which are relied upon and incorporated herein by reference; additionally, Applicants claim the right of priority under 35 U.S.C. §119(a)-(d) based on patent application No. 99830749.0, filed Dec. 1, 1999, in the European Patent Office; further, Applicants claim the benefit under 35 U.S.C. §119(e) based on prior-filed, provisional application No. 60/176,812, filed Jan. 19, 2000, in the U.S. Patent and Trademark Office.

BACKGROUND OF THE INVENTION

1. Field of the Invention

The present invention relates to a tire for motor vehicles, and more particularly to a tire for heavy duty vehicles such as lorries and the like which are intended for mixed operation, in other words for use both on roads with good surface conditions and or rough and irregular grounds such as those generally present in quarries and/or on building sites.

2. Description of the Related Art.

As is known, heavy duty vehicles such as lorries are generally fitted with tyres of different types according to whether they are to be fitted on the traction (driving) axles or on the driven (steering) axles.

This differentiation is due to the different performances and behavioural characteristics required from tyres according to the axle on which they are fitted and on the type of operation for which they are intended.

For example, for operation predominantly on roads with good surface conditions, the tyres fitted on the driving wheels, generally the rear wheels, are mainly required to have good traction in any road surface condition, whether dry, wet or icy, and a good regularity of wear which provides a high mileage.

For this purpose, tyres with a tread of the so-called "lug" type are used, in other words tyres having a tread provided with a plurality of lugs formed by a combination of circumferential channels intersected by transverse channels, of considerable width, normally not less than approximately 5 mm. The dimensions and orientation of the transverse channels have a considerable effect on the ground-gripping action exerted by the tread.

On the other hand, the tyres fitted on the driven axles, generally the front axles, are primarily required to have a high directional stability, good grip and lateral roadholding, together with low abradability and high tear resistance, to provide a good mileage.

For this purpose, therefore, use is made of tyres having a tread of the so-called "grooved" type, in other words a tread provided with grooves of the circumferential type, with a rectilinear or zigzag configuration, which form on the tread a plurality of circumferential ribs, in other words a plurality of continuous circumferential strips which do not have transverse cuts extending over their whole width.

Conversely, for operation on rough and irregular surfaces, and also on muddy and/or sandy surfaces, tyres of the lug type are predominantly used on the front axles as well, although the transverse cuts delimiting said lugs are normally narrower than the transverse cuts of the tyres for use on the driving axles. Thus, there are known tyres whose tread comprises circumferential grooves with a zigzag configuration, creating a plurality of circumferential lugs delimited circumferentially by sipes, in other words by very narrow transverse cuts, each of which interconnects two adjacent circumferential grooves.

This type of tread is described, for example, in EP-384,182 in relation to a tyre for motor vehicles, particularly for medium and heavy duty vehicles. This tread has a plurality of zigzag circumferential grooves delimited by a pair of shoulder ribs, located on opposite edges of the tread, and a plurality of circumferential rows of lugs delimited by transverse cuts having a width of less than 3 mm. The transverse cuts of each circumferential row of lugs are staggered circumferentially with respect to the transverse cuts of the adjacent row, and have an inclination in the range from 5° to 25° with respect to the direction perpendicular to the outer surface of the tread.

Furthermore, the inclination of the aforesaid cuts with respect to the normal direction of rotation of the tyre is such that, during travel, the reactions transmitted by the ground to the tread in the contact area tend to reduce this inclination with respect to said direction perpendicular to the outer surface of the tread, in order to provide a greater uniformity of wear of the lugs and to avoid the known phenomenon of "saw-tooth" wear U.S. Pat. No. 4,550,756 shows a pneumatic tyre having a ground tread portion, the tread portion comprising at least two circumferentially extending grooves, each groove having a pair of oppositely disposed sidewalls. The included angle between the second portion of the first groove sidewall and the second sidewall being at least 30°.

U.S. Pat. No. 3,858,633 illustrates a radial tyre for heavy-duty vehicles comprising a tread having a central portion and two lateral portions. The central portion is formed with at least one circumferential rib and at least two circumferential grooves, and each lateral portion is formed with a circumferential zigzag rib and with transverse grooves and blocks.

SUMMARY OF THE INVENTION

The present invention relates to a tyre provided with a tread of the "grooved" type, in other words a tread not having transverse cuts extending over its whole width, and designed to be fitted on the steering axles of a medium or heavy duty vehicle, particularly of a motor vehicle designed for mixed use on both roads and rough ground.

The applicant has perceived that, in order to provide a medium or heavy duty vehicle with good directional stability, a high mileage and good roadholding even on particularly rough ground, it is necessary to fit on the front axle of said vehicle a tyre whose tread is provided with circumferential grooves of the zigzag type and which has no open transverse cuts.

The applicant has also found that the above properties are considerably enhanced when the configuration of the aforesaid zigzag circumferential grooves has two or more changes of direction with respect to the circumferential direction of the tyre within a single pitch, in such a way as to produce a large number of ground-gripping fronts of the tread.

The applicant has additionally found that a further enhancement of the aforesaid properties, particularly in terms of roadholding, can be obtained by providing each circumferential groove with at least one blind transverse cut per pitch. More particularly, the geometrical dimensions of these blind transverse cuts, which extend axially preferably from both sides of the circumferential groove, must be such that they do not significantly reduce the width of the solid continuous circumferential zone of the adjacent circumferential ribs, as this would have a negative effect on the desired properties of directional stability and abrasion resistance mentioned above.

Therefore, in its first aspect the present invention relates to a tyre for vehicle wheels, particularly for fitting on the steering axles of medium and heavy duty vehicles on mixed routes, comprising a carcass, a tread placed on the crown of said carcass and a belt structure interposed between said carcass and said tread, said tread being provided with a relief pattern comprising at least two circumferential grooves with a zigzag configuration, which form at least three circumferential ribs, namely two shoulder ribs and at least one central rib, each of said at least two circumferential grooves having a shape which is repeated identically according to a predetermined circumferential pitch, characterized in that:

a) each of said at least two zigzag circumferential grooves within a single pitch comprises at least two different directions, which are different from the circumferential direction and which generate at least two ground-gripping fronts in each of the two travel directions of said tyre;

b) each of said at least two zigzag circumferential grooves within a single pitch has at least one blind transverse cut extending from opposite sides of said circumferential groove, which generates a third ground-gripping front;

c) the axially opposite ends of the blind transverse cuts belonging to two adjacent zigzag circumferential grooves are positioned on at least two separate planes, parallel to each other and to the equatorial plane of said tyre, at least two of said planes delimiting between them a continuous portion of at least one circumferential rib, said continuous portion having a constant axial width.

According to further embodiments, the number of said circumferential grooves can be greater than two, although preferably not greater than four; in a preferred embodiment, the tread according to the invention comprises three circumferential grooves delimiting four circumferential ribs, namely two axially outer shoulder ribs and two axially inner intermediate ribs.

According to a further embodiment, all the circumferential grooves are identical to each other and, even more preferably, also the blind transverse cuts are identical to each other. Preferably, the contour profile of each circumferential groove, including the blind transverse cuts, comprises only connecting portions of curvilinear shape.

BRIEF DESCRIPTION OF THE DRAWINGS

Further characteristics and advantages will be more clearly understood from a description of a preferred embodiment of the present invention.

This description, given below, relates to the attached drawings, supplied solely for the purpose of explanation and without any restrictive intent, in which.

DETAILED DESCRIPTION OF THE PREFERRED EMBODIMENTS

Figure 1:
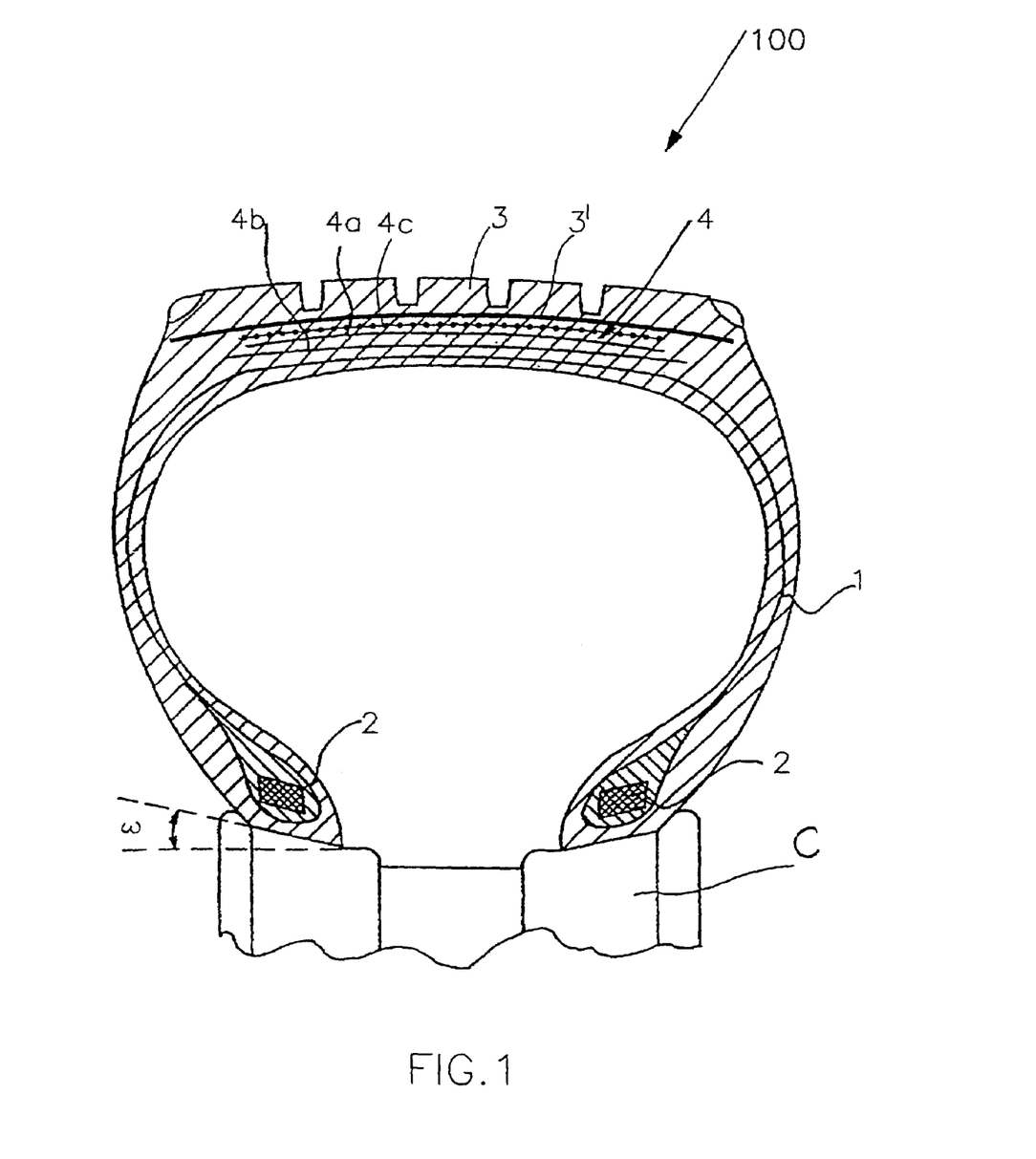
FIG. 1 shows a partial cross section of the structure of a tyre according to the invention.

FIG. 1 shows a tyre 100 for motor vehicles, designed to be fitted on the front (steering) axle of a medium or heavy duty vehicle of the type used both on road routes and on rough routes, for example on building sites and/or in quarries.

Tyre 100 comprises a carcass of toroidal shape, generally consisting of a single reinforcing ply 1 provided with metal cords lying in radial planes, in other words containing the rotation axis of the tyre. The ends of carcass ply 1 are turned axially from the inside towards the outside, around two metal annular cores 2, usually known as bead wires, which form the reinforcement of the beads, in other words the reinforcement of the radially inner edges of said tyre. As is known, the beads enable the tyre to be fitted on the corresponding mounting rim C. In FIG. 1, tyre 100 is fitted on a rim of the so-called "channel" type, in which the supporting bases for the tyre beads conically diverge outwards at an angle ω of about 15°.

A tread 3 of elastomeric material, within which is formed a relief pattern providing the ground contact of tyre 100, is placed on the crown of said carcass. In the following of the present description and in the claims, the expression "elastomeric material" denotes a rubber mixture as a whole, in other words containing at least one base polymer, the reinforcing fillers, and further product and process additives normally used for manufacturing and curing the tyre.

Tread 3, and the pattern formed in it, must be such as to provide aforesaid tyre 100 with the required behavioural properties, including, for example, directional stability, traction, mileage, silent running and regularity of wear.

Tread 3 has a predetermined thickness and is delimited by an outer surface, designed to contact the ground, and an inner surface covered with a strip 3' made from elastic material and designed to promote the necessary adhesion between the elastomeric material of tread 3 and a so-called belt package 4.

The aforesaid belt package is a circumferentially inextensible annular reinforcing structure, placed between carcass 1 and tread 3. Generally, the belt structure comprises at least two radially superimposed layers 4a, 4b of rubberized fabric, provided with metal reinforcing cords. In each layer 4a, 4b, said cords are placed parallel to each other and cross over the cords of the adjacent layers; preferably, the cords in said layers are also placed symmetrically about the equatorial plane of the tyre. Preferably, the aforesaid belt package has a further, third layer 4c of metal cords of the high-elongation (HE) type, wound circumferentially on the underlying belt layers or only on the axially outer positions of said layers, in such a way that it is wound round only the edges of the aforesaid underlying layers. This further layer helps to oppose the forces, acting in the tyre in operating conditions, which are related to inflation pressure and to centrifugal force, and imparts particular handling properties to the tyre, especially during cornering.

Figure 2:
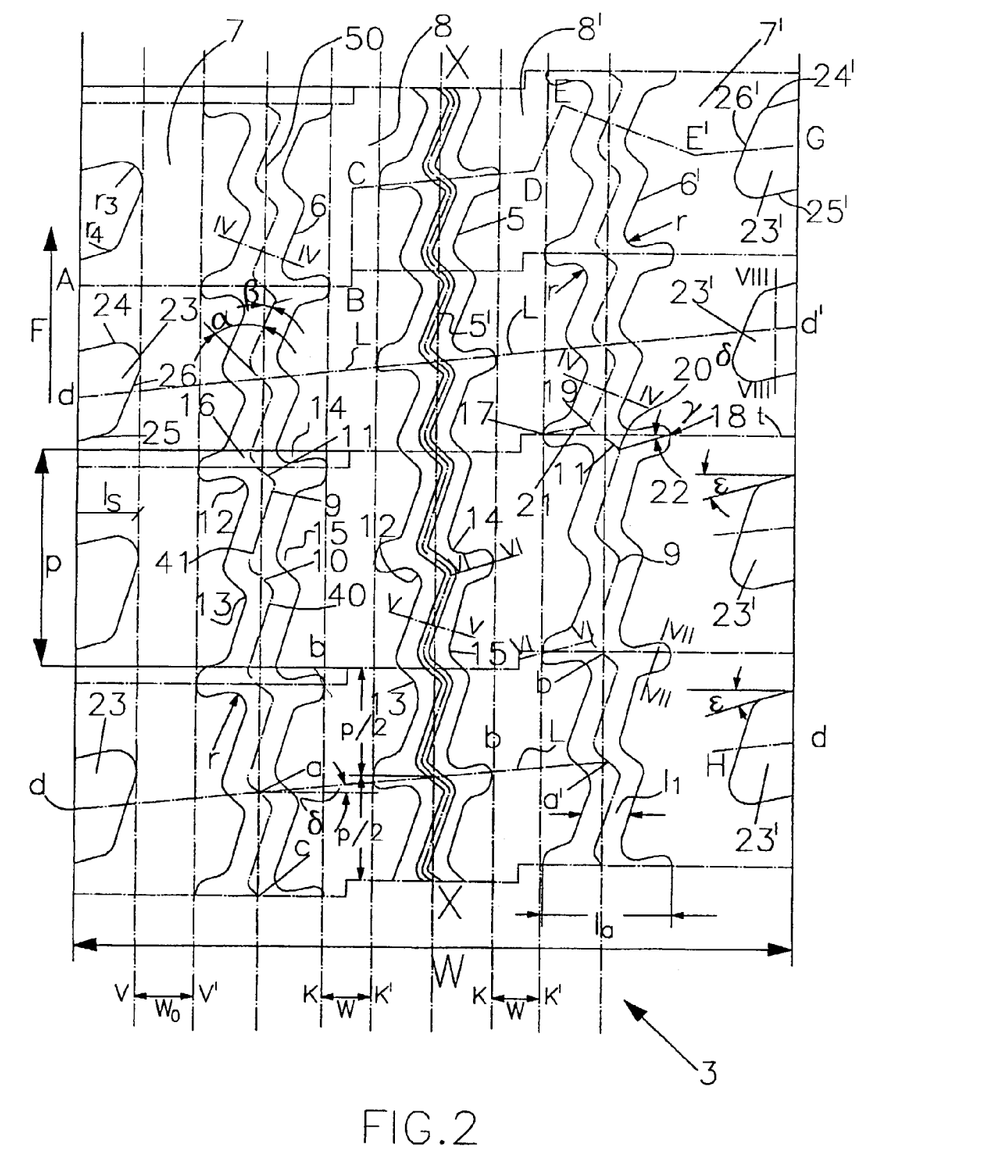
FIG. 2 shows a partial plan view of a tread pattern according to the invention.

FIG. 2 shows a particular embodiment of a tread 3 of a tyre for motor vehicles according to the present invention. This tread comprises three circumferential grooves 5, 6, 6' of the zigzag type and four circumferential ribs 7, 7', 8, 8' created by the aforesaid grooves. More precisely, FIG. 2 shows a central circumferential groove 5, positioned on the equatorial plane X-X, and a pair of lateral circumferential grooves 6, 6' placed respectively on the left and on the right of said circumferential groove 5. The aforesaid circumferential ribs comprise two axially outer lateral shoulder ribs 7, 7', located respectively on the left of circumferential groove 6 and on the right of circumferential groove 6', and two axially inner intermediate ribs 8, 8', located respectively on the left and on the right of central circumferential groove 5.

Each circumferential groove 5, 6, 6' has a geometrical shape which is repeated identically in the circumferential direction with a predetermined pitch "p".

More precisely, in the embodiment shown in FIG. 2, within each pitch "p" each circumferential groove is developed according to an alternating circumferential succession of substantially rectilinear portions, alternately inclined in two different directions with respect to the circumferential direction.

Preferably, within a single pitch "p", each circumferential groove 5, 6, 6' comprises a first pair of substantially rectilinear portions 40, 41 and a second pair of substantially rectilinear portions 10, 11.

In the embodiment shown in FIG. 2, the zigzag configuration of each circumferential groove 5, 6, 6' within a given pitch "p" is therefore identified by a broken line 9 which is defined by the sequence of the substantially rectilinear portions 40, 10, 41, 11.

Preferably, substantially rectilinear portions 10, 11 are of equal length and are inclined at the same angle α with respect to the circumferential direction 50. Preferably, substantially rectilinear portions 40, 41 are of equal length and are inclined, in the opposite direction to the angle α, at the same angle β with respect to the aforesaid circumferential direction 50.

The dimensional parameters indicated below relate, purely by way of example, to a tread associated with a new prototype tyre of the 13 R 22.5 size, where 13 indicates the maximum width, in other words the maximum chord, of the tyre expressed in inches, said tyre being fitted on the recommended rim and inflated to its nominal operating pressure. The ranges of the cited values relate to the generic tyre according to the invention.

The tread pattern of said tyres comprises at least two distinct pitches: the pattern of the prototype tyre cited above comprises a short pitch of 62.376 mm, which is repeated 28 times along the circumference of the tyre and is intercalated with a long pitch of 74.228 mm, repeated 24 times along said circumference.

Preferably, the ratio between the length of the linear extension of the mid-line circumferential groove within one pitch, coinciding with the length of broken line 9 in said pitch, and the length of the pitch "p" is not less than 1.12; in a preferred embodiment, angles α and β are 40° and 18° respectively. Preferably, angle α is in the range from 30° to 55°, while angle β is in the range from 12° to 25°.

According to the present invention, the changes of direction provided in each circumferential groove within a single pitch "p" generate two ground-gripping fronts 12, 13 of tread 3 in the direction of rolling of tyre 100 (indicated by arrow F in FIG. 2), and another two ground-gripping fronts 14, 15 of tread 3 in the direction opposite the indicated direction of rotation F.

Figure 3:
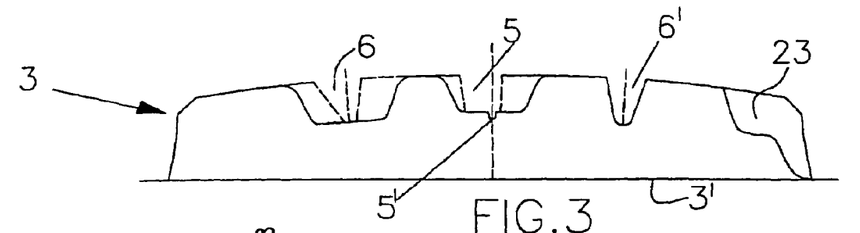
FIG. 3 shows the cross section of a tread according to the invention, cut along the plane following the line A-B-C-D-E-E'-G on the drawing of FIG. 2.
Figure 4:
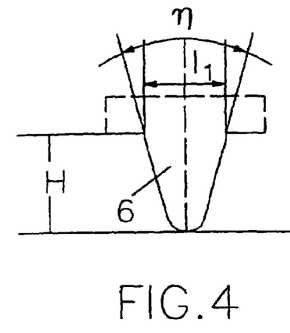
FIG. 4 shows a partial cross section of the tread of FIG. 3 through the plane IV-IV of FIG. 2.
Figure 5:
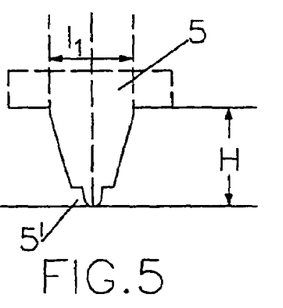
FIG. 5 shows a partial cross section of the tread of FIG. 3 through the plane V-V of FIG. 2.

As shown in FIGS. 3, 4 and 5, each circumferential groove 5, 6, 6' has a V-shaped cross section; in other words the sides of the groove converge towards the bottom of the groove: preferably, these sides form an angle η of not less than 30° between them.

The aforesaid circumferential grooves preferably have a width $l_1$ in the range from 12 mm to 17 mm and a depth H in the range from 15 mm to 24 mm. In the illustrated embodiment, H is equal to 19 mm. The geometrical dimensions of said grooves are selected in a suitable way such that stones and/or deposits, which may be picked up by the tread during the travel of the tyre, are not retained, but can easily be removed from the tread, or leave the latter spontaneously in order to prevent any possible damage to the bottom of said grooves.

In another preferred embodiment of the present invention, the bottom of central circumferential groove 5 has a narrow indentation 5' (FIGS. 2, 3, and 5) whose width and depth preferably do not exceed 4 mm, being 3.5 mm and 3 mm respectively for the described prototype. The purpose of this indentation is to prevent the initiation of tears on the bottom of said groove 5 due to any trapping of stones and/or other deposits.

Preferably, each circumferential groove 5, 6, 6' within a single pitch "p" has at least one blind transverse cut 16 extending axially from both sides of the groove, in such a way that it forms a third ground-gripping front.

In the described embodiment, three circumferential grooves 5, 6, 6' are identical to each other and the blind transverse cuts belonging to two adjacent circumferential grooves are staggered in the circumferential direction.

In a preferred embodiment of the invention, the profile of the blind transverse cuts is linked with the profile of the corresponding circumferential groove by means of curvilinear portions, preferably in the form of circle arcs. These profiles consist of the edges of the cuts and of the groove on the surface of the tread. In fact, this constructional solution protects the elastomeric material of the tread from the initiation of irregular and/or premature wear and from tears which would cause unacceptable damages to the tread. Even more preferably, the whole surface profile of the circumferential grooves, including the transverse cuts, is made with a rounded shape, free of sharp corners.

In other words, by contrast with the prior art tread, the zigzag circumferential grooves of the tread according to the present invention, in the preferred embodiment shown in FIG. 2, have a particularly rounded profile along which there are no sharp-edged shapes and/or sharp corners, especially in particularly critical areas such as those which mark the changes of direction or the linking areas between the groove portion with the zigzag configuration and the blind transverse cuts.

As shown in FIG. 2, the circumferential extension oz each blind transverse cut 16 contains a substantially rectilinear portion 11 of the corresponding circumferential groove orientated in one of the two separate directions which, as stated above, represent the changes of direction which generate the zigzag configuration defined, in each pitch "p", by aforesaid broken line 9.

More precisely, the axis of the blind transverse cuts consists of a three-part broken line 21, 11 and 22, whose central part is formed by aforesaid rectilinear portion 11.

Overall, therefore, blind transverse cut 16 has, in the substantially axial direction, a configuration of the zigzag type defined by the succession of said rectilinear portions 21, 11, 22.

End parts 21 and 22 of this broken line intersect the lateral ends of blind transverse cut 16 at two points, namely 17 and 18 respectively, which lie on the same straight line "t" which is substantially perpendicular to the equatorial plane. In the embodiment shown in FIG. 2, the straight line "t" passes through the centre of substantially rectilinear portion 11.

Blind transverse cut 16 is substantially axially delimited as to width by the two ends marked by aforesaid points 17 and 18.

More particularly, two segments 21, 22 extending in each blind transverse cut 16, between aforesaid ends 17, 18 of the same cut and ends 19, 20 of substantially rectilinear portion 11, are preferably of equal length and both inclined at an angle γ, preferably of identical value, with respect to the straight line "t" mentioned above.

Preferably, this angle γ has a value not exceeding 25°, in such a way that the radii of curvature "r" of the curvilinear surfaces which link the walls of the blind transverse cut with the walls of the circumferential groove are sufficiently large to avoid, or at least to reduce, the aforesaid risks of tearing and irregular and/or premature wear of the elastomeric material of the tread. Preferably, "r" is at least equal to 5 mm.

In order to minimize the aforesaid risks and to maximize the resistance of circumferential ribs 7, 7', 8, 8' to tearing and to the aforesaid kinds of wear, the applicant has found to preferably limit the dimensions of the blind transverse cuts by specifying particular values of the ratios between the aforesaid dimensions and the dimensions of both the zigzag circumferential grooves and the tread as a whole.

Figures 6, 7:
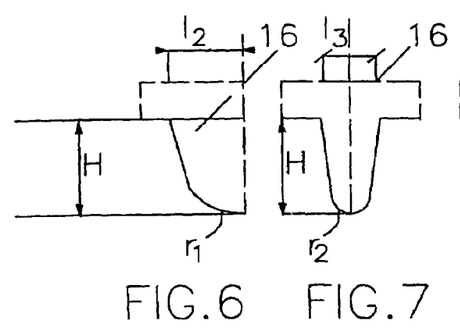
FIG. 6 shows a partial cross section of the tread of FIG. 3 through the plane VI-VI of FIG. 2.
FIG. 7 shows a partial cross section of the tread of FIG. 3 through the plane VII-VII of FIG. 2.

More specifically, the preferred values of the dimensions and ratios are those shown in the following Table 1, where the symbols have the following meanings (see the attached figures):

"W" is the width of the tread pattern (FIG. 2);

"$l_a$" is the axial width of the blind transverse cut (FIG. 2);

"$l_1$" is the width of the circumferential groove (FIG. 2—section IV-IV; FIGS. 4 and 5);

"$l_2$" is the length of the blind transverse cut along portion 21 (FIG. 2—section VI-VI; FIG. 6)

"$l_3$" is the width of the blind transverse cut along section VII-VII (FIG. 2; FIG. 7).

TABLE 1

| Dimension/Ratio | Range of values |
| --- | --- |
| "W" (mm) | 220-240 |
| "$l_a$" (mm) | 35-41 |
| "$l_a$"/"W" | 0.15-0.18 |
| "$l_1$" (mm) | 12-17 |
| "$l_1$"/"W" | 0.06-0.08 |
| "$l_2$" (mm) | 13-16.5 |
| "$l_3$" (mm) | 8-11 |

The walls which delimit each blind transverse cut 16 advantageously converge towards the bottom of the cut and are linked to the bottom by curvilinear surfaces represented on the cross section by corresponding circular arcs. With reference to the embodiments indicated in the cross sections of FIGS. 6 and 7, these circular arcs have respective radii of curvature "$r_1$", equal to 7 mm, and "$r_2$", equal to 3.5 mm, said values being suitably selected in such a way as to prevent undesired tearing of the elastomeric material at the bottom of the indentation.

Additionally, in order to achieve a good traction, it is preferable for the depth of blind transverse cuts 16 to be equal to the maximum depth "H" of circumferential grooves 5, 6, 6'.

With reference to each circumferential groove 5, 6, 6', where "b" and "c" (see FIG. 2) denote the centres of two consecutive blind transverse cuts belonging to a single circumferential groove, and "a" denotes the centre of the portion of said circumferential groove lying between said two consecutive blind transverse cuts, the centres "b" and "c" are spaced apart from the centre "a" by half of one pitch.

As shown in FIG. 2, in the illustrated embodiment the arrangement of the adjacent circumferential grooves is such that said circumferential grooves are staggered in the circumferential direction.

In fact, for a single pitch "p", the two centres (a and a') of the lateral circumferential grooves 6 and 6' respectively are positioned along a straight line "L" which is inclined with respect to the axial direction, and on which the centre "b" of blind transverse cut 16 of central circumferential groove 5 is also positioned.

More precisely, this straight line "L" forms with the aforesaid axial direction an angle δ which is preferably in the range from 4° to 15°.

In a preferred embodiment of the invention, the tread comprises further traction elements 23, 23', in the form of a plurality of notches positioned on shoulder ribs 7 and 7' respectively, in an axially outward position of these ribs.

Each notch 23, 23' is delimited, in the circumferential direction, by at least two end walls, forming front walls 24, 24' and rear walls 25, 25' respectively according to the direction of travel F, and in the transverse direction by a wall 26, 26' which is substantially parallel to substantially rectilinear portions 40, 41 of adjacent circumferential grooves 6, 6'.

End walls 24, 25 (and 24', 25'), which are preferably parallel to each other, form an angle ε of 17°, preferably in the range from 10° to 30°, with respect to the axial direction and are linked with longitudinal wall 26 (and 26') by curvilinear surfaces having radii of curvature "$r_3$" and "$r_4$" respectively. Said radii of curvature are preferably longer than 4 mm.

Figure 8:
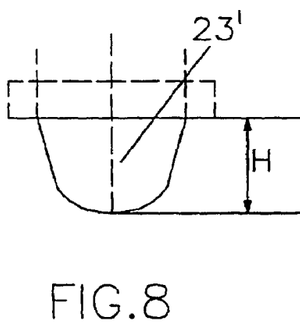
FIG. 8 shows a partial cross section of the tread of FIG. 3 through the plane VIII-VIII of FIG. 2.

In order to ensure good traction, the axial extension "$l_S$" of each cut 23, 23' is equal to at least 8% of the width "W" of the tread, and the depth of notch 23, 23' is equal to "H" (FIG. 8). Preferably, the walls of notch 23, 23' are linked with the bottom by a curvilinear surface having a radius of curvature which is longer than 8 mm.

As shown in FIG. 2, notches 23, 23' present in the circumferential ribs 7 and 7' respectively are circumferentially staggered with respect to blind transverse cuts 16 of the adjacent circumferential grooves.

Preferably, also the centres (d and d') of notches 23 and 23' of circumferential ribs 7 and 7' are positioned, within a single pitch "p", on the aforesaid straight line "L" joining the centres (a and a') of identical portions 11 of circumferential grooves 6, 6' with the centre (b) of central circumferential groove 5.

One of the principal characteristics of the tread according to the present invention consists in the combination of circumferential grooves 5, 6, 6' of considerable depth with particularly strong circumferential ribs 7, 7', 8, 8'.

The strength of axially inner ribs 8, 8' is due to the fact that the ends of blind transverse cuts 16 belonging to two adjacent circumferential grooves, in other words ends 17, 18 facing each other, although staggered in the circumferential direction, are aligned on two planes k and k' respectively, which are parallel to each other and to the equatorial plane X-X, and are suitably spaced apart from each other.

As shown in FIG. 2, these pairs of planes k, k' are spaced apart by a predetermined and constant amount w, and the tread portion lying between said planes is preferably free of sipes and/or grooves which, over time, could initiate tears of the elastomeric material or give rise to phenomena of structural weakening.

This means, therefore, that each of axially inner ribs 8, 8' comprises a solid circumferential portion (lying between aforesaid planes k, k') capable of imparting a high directional stability and high abrasion resistance to said ribs.

The same characteristic is preferably also provided to lateral ribs 7 and 7': FIG. 2 shows that also the axially inner ends of notches 23 lie on a single plane V, parallel to the equatorial plane X-X and to a plane V' on which lie the axially outer ends of blind transverse cuts 16 present in adjacent circumferential groove 6. The planes V-V' are spaced apart by an amount equal to $w_0$.

In a similar way to that described previously for ribs 8 and 8', also the tread portion lying between the planes V-V' of rib 7 is preferably continuous, in other words free of sipes or grooves. This tread portion therefore imparts high strength and high abrasion resistance to aforesaid rib 7.

The tyre according to the invention has a tread structure which is preferably symmetrical, and therefore the description and illustration (planes V and V'—FIG. 2) provided above in relation to circumferential rib 7 is intended to be applied also to rib 7'.

Table 2 shows some preferred values of the distances w and $w_0$, and of their ratios to the width "W" of the tread.

TABLE 2

| Value | Range of values |
|---|---|
| "w" (mm) | 8.5-15.5 |
| "w"/"W" | 0.03-0.07 |
| "$w_0$" (mm) | 15-19.5 |
| "$w_0$"/"W" | 0.06-0.09 |

Since, as is well known to those skilled in the art, for a given abrasion resistance of the mixture, the mileage is proportional to the quantity of abradable rubber (depth of the grooves present in the tread) and to the specific abrasion during the use of the tyre, the high strength of ribs 7, 7', 8, 8' (in other words the big area of the solid parts of the aforesaid ribs) and the considerable depth of grooves 5, 6, 6' of the tread according to the present invention enable a high mileage to be obtained.

On the other hand, the presence of extensive portions of tread of a continuous type, in other words without transverse cuts or grooves, in the circumferential ribs has no negative effect on the traction and lateral roadholding conditions of the tread.

This is because traction is ensured, within a single pitch, by the presence of a blind transverse cut possessed by each circumferential groove, and also by the presence of two separate gripping areas 12, 13 in the direction of travel F (and of two separate gripping areas 14, 15 in the direction opposite to F), created by the changes in direction of each circumferential groove within a single pitch "p".

Furthermore, high traction and lateral roadholding are also achieved by means of additional notches 23, 23' in circumferential shoulder ribs 7, 7', having a depth preferably equal to that of circumferential grooves 5, 6, 6'.

Moreover, this traction is obtained progressively promoting regular wear and lower noise of the tread thanks to the staggered positions of the traction elements identified above, such as blind transverse cuts 16 and notches 23, 23' of circumferential shoulder ribs 7, 7'.

Figure 9:
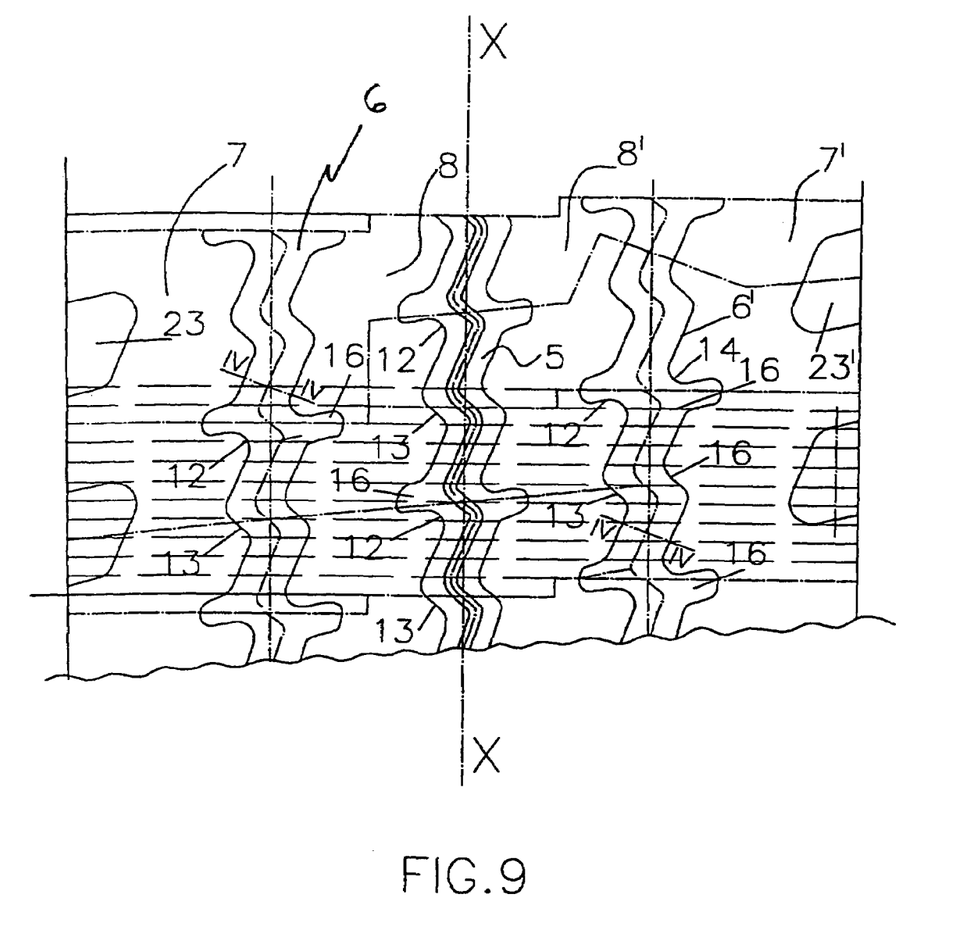
FIG. 9 shows a succession of gripping fronts, within one pitch and according to a given travel direction, applied to the partial plan view of FIG. 2.

FIG. 9 shows a partial plan view of a tread according to the invention, in the embodiment shown in FIG. 2. Said FIG. 9 shows a plurality of lines positioned perpendicular to the equatorial plane X-X and representing the advance of the ground impact fronts of the tyre during the travel of the tyre. If the direction of rolling F of FIG. 2 is assumed, the advance of the impact fronts shows that a given blind transverse cut (for example, blind transverse cut 16 of circumferential groove 6) starts to grip when a preceding blind transverse cut (for example, blind transverse cut 16 of circumferential groove 6') has practically terminated its gripping action.

In the same way, in a single pitch "p", also two gripping areas 12, 13 (as well as gripping areas 14, 15 in the case of a direction of travel opposite to F), produced as a result of the changes of direction of the zigzag configuration of each circumferential groove 5, 6, 6', progressively enter the footprint area with a continuity of movement which prevents the development of beats and discontinuities which would be associated with a variation of the axial extension of the impact fronts entering or leaving the footprint area at the same time, the result of which would be a qualitative deterioration of performance in terms of roadholding and noise.

Preferably, as may be seen from the configuration shown in FIG. 9, within a single pitch "p", at the moment at which the front of advance does not include either a blind transverse cut 16 or gripping areas 12, 13, said front of advance includes a shoulder notch 23, 23' which provides a ground gripping point for the tread of the tyre according to the invention.

This means, therefore, that in any direction of travel of the tyre, in other words independently of the direction of fitting of the tyre on the vehicle, there is an advantageous continuous traction capacity of the tread which gives a positive contribution to comfort, stability of travel and longer mileage.

A person skilled in the art, having understood the invention as described above, will be capable of making all the necessary choices, variations and modifications of the variables associated with the invention to solve the specific technical problem faced by him, in other words to give priority to a specific aspect of behaviour (for example the mileage rather than the silence of running by increasing the depth of the grooves, or the traction rather than the wear by increasing the width of the transverse inclined cuts, etc.) according to the severity of the operating conditions for the particular application of the vehicle which is to be fitted with the tyres according to the invention.

The invention claimed is:

1. A tyre for a wheel of a vehicle, comprising:
   a carcass;
   a belt structure; and
   a tread;
   wherein the carcass comprises a central crown portion and two axially opposite sides comprising beads for mounting the tyre on a corresponding rim of a wheel,
   wherein the belt structure is coaxially associated with the carcass,
   wherein the tread extends coaxially around the belt structure,
   wherein the tread comprises a pattern, comprising:
      at least two circumferential grooves; and
      at least three circumferential ribs;
   wherein each of the at least two circumferential grooves comprises a zigzag configuration,
   wherein the at least three circumferential ribs comprise at least one central rib and two shoulder ribs,
   wherein each of the at least two circumferential grooves further comprises a shape that is repeated identically according to a predetermined circumferential pitch,
   wherein each of the at least two circumferential grooves further comprises, within the single pitch, at least one blind transverse cut intersecting said each of the at least two circumferential grooves and extending from opposite sides of said each of the at least two circumferential grooves,
   wherein each of the at least two circumferential grooves further comprises, within the single pitch, first, second, and third changes in direction, at least two of the first, second, and third changes in direction being disposed outside of said at least one blind transverse cut with respect to a circumferential direction of the tread, and each change in direction being different from a circumferential direction of the tyre, wherein at least two different directions associated with at least one of the first, second, and third changes in direction generate at least two ground-gripping fronts in each of two rotation directions of the tyre, wherein the at least one blind transverse cut generates a third ground-gripping front in each of the two rotation directions of the tyre, wherein a first end of at least one blind transverse cut of a first one of the at least two circumferential grooves is positioned on a first plane between the first one of the at least two circumferential grooves and an adjacent second one of the at least two circumferential grooves, wherein an end of at least one blind transverse cut of the second one of the at least two circumferential grooves is positioned on a second plane between the first one of the at least two circumferential grooves and the second one of the at least two circumferential grooves, wherein the first and second planes are parallel to each other and to an equatorial plane of the tyre, wherein the first and second planes delimit a continuous portion of at least one of the circumferential ribs, wherein the continuous portion comprises a constant axial width, wherein axially opposite ends of the at least one blind transverse cut of the first one of the at least two circumferential grooves are disposed on a straight line, wherein the straight line is perpendicular to the equatorial plane of the tyre, wherein the first one of the at least two circumferential grooves and the second one of the at least two circumferential grooves comprise rectilinear portions, wherein a circumferential extension of the at least one blind transverse cut comprises one of the rectilinear portions of a corresponding one of the at least two circumferential grooves, wherein the rectilinear portion is oriented in one of the different directions, wherein an axis of the at least one blind transverse cut comprises a broken line segment with three parts, wherein the three parts comprise a central part and two end parts, and wherein the rectilinear portion comprises the central part.

2. The tyre of claim 1, wherein each, of the at least two different directions is repeated at least twice within a single pitch.

3. The tyre of claim 1, wherein one or more of the at least two different directions is inclined with respect to the circumferential direction of the tyre at a first angle in a range from 30° to 55°.

4. The tyre of claim 1, wherein one or more of the at least two different directions is inclined with respect to the circumferential direction of the tyre at a second angle in a range from 12° to 25°.

5. The tyre of claim 1, wherein each of the at least two circumferential grooves comprises a mid-line, and
wherein within a single pitch, a ratio of a length of the mid-line of the respective one of the at least two circumferential grooves, measured along the mid-line to a length of the pitch, is not less than 1.12.

6. The tyre of claim 1, wherein a ratio of the constant axial width of the continuous portion to a width of the tread is in a range from 0.03:1 to 0.07:1.

7. The tyre of claim 1, wherein a depth of the at least one blind transverse cut is equal to a depth of a corresponding one of the at least two circumferential grooves.

8. The tyre of claim 1, wherein a first end part is inclined at a third angle of not more than 25° with respect to an axial direction of the tyre, and
wherein a second end part is inclined at a fourth angle of not more than 25° with respect to the axial direction of the tyre.

9. The tyre of claim 8, wherein the third angle is substantially equal to the fourth angle.

10. The tyre of claim 1, wherein the two end parts are of substantially equal length.

11. The tyre of claim 1, wherein an axially opposite, second end of the at least one blind transverse cut of the first one of the at least two circumferential grooves is positioned on a third plane,
wherein the third plane is parallel to the first plane and to the equatorial plane of the tyre, and
wherein a ratio of a distance in an axial direction of the tyre between the first and third planes to a width of the tread is in a range from 0.15:1 to 0.18:1.

12. The tyre of claim 1, wherein a link between a profile of the at least one blind transverse cut and a contour profile of a corresponding one of the at least two circumferential grooves is a profile of a curvilinear type.

13. The tyre of claim 1, wherein blind transverse cuts of different ones of the at least two circumferential grooves are staggered with respect to each other in the circumferential direction of the tyre.

14. The tyre of claim 1, wherein a straight line joining identical points of two adjacent ones of the at least two circumferential grooves within a single pitch forms a fifth angle in a range from 4° to 15° with respect to an axial direction of the tyre.

15. The tyre of claim 1, wherein the pattern with the at least two circumferential grooves comprises three circumferential grooves,
wherein each of the three circumferential grooves comprises a zigzag configuration, and
wherein the three circumferential grooves comprise at least one central groove and two lateral grooves.

16. The tyre of claim 15, wherein the three circumferential grooves have the same shape.

17. The tyre of claim 1, wherein at least one of the shoulder ribs comprises a plurality of notches in an axially-outer position.

18. The tyre of claim 17, wherein a depth of the notches is equal to a depth of the at least two circumferential grooves.

19. The tyre of claim 17, wherein each of the notches comprises, with respect to the circumferential direction of the tyre, at least two end walls and at least one lateral wall.

20. The tyre of claim 19, wherein the at least two end walls and the at least one lateral wall are linked together by surfaces of a curvilinear type.

21. The tyre of claim 17, wherein within a single pitch, centers of the notches lie on straight lines passing through centers of identical portions of two axially-outermost ones of the at least two circumferential grooves.

22. The tyre of claim 1, wherein walls of the at least two circumferential grooves and walls of corresponding blind transverse cuts are linked together by curvilinear surfaces comprising a radius of curvature of at least 5 mm.

23. The tyre of claim 1, wherein for each of the at least two circumferential grooves, walls of the at least two circumferential grooves are linked with a bottom of the at least two circumferential grooves by curvilinear surfaces comprising a radius of curvature of at least 3.5 mm, and
wherein for each of the blind transverse cut, walls of the blind transverse cut are linked with a bottom of the blind transverse cut by curvilinear surfaces comprising a radius of curvature of at least 3.5 mm.

24. The tyre of claim 1, wherein lateral walls of each of the at least two circumferential grooves converge radially inward at a sixth angle of not less than 30°.

25. The tyre of claim 1, wherein each of the at least two circumferential grooves comprises a width in a range from 12 mm to 17 mm and a maximum depth in a range from 15 mm to 24 mm.

26. The tyre of claim 15, wherein a bottom of the at least one central groove comprises an indentation.

27. A tyre for a wheel of a vehicle, comprising:
a carcass;
a belt structure; and
a tread;
wherein the carcass comprises a central crown portion and two axially opposite sides comprising beads for mounting the tyre on a corresponding rim of a wheel,
wherein the belt structure is coaxially associated with the carcass,
wherein the tread extends coaxially around the belt structure,
wherein the tread comprises a pattern, comprising:
at least two circumferential grooves; and
at least three circumferential ribs;
wherein said each of the at least two circumferential grooves comprises a zigzag configuration,
wherein the at least three circumferential ribs comprise at least one central rib and two shoulder ribs,
wherein said each of the at least two circumferential grooves further comprises a shape that is repeated identically according to a predetermined circumferential pitch,
wherein said each of the at least two circumferential grooves further comprises, within a single pitch, substantially rectilinear portions,
wherein the substantially rectilinear portions are alternately inclined with respect to a circumferential direction of the tyre,
wherein said each of the at least two circumferential grooves further comprises, within the single pitch, first, second, and third changes in direction, at least two of the first, second, and third changes in direction being disposed outside of at least one blind transverse cut intersecting a corresponding one of the at least two circumferential grooves, with respect to a circumferential direction of the tread, and extending from opposite sides of the circumferential groove,
wherein a first end of a first one of at least one blind transverse cut of a first one of the at least two circumferential grooves is positioned on a first plane between the first one of the at least two circumferential grooves and an adjacent second one of the at least two circumferential grooves,
wherein a second end of second one of at least one blind transverse cut of a second one of the at least two circumferential grooves is positioned on a second plane between the first one of the at least two circumferential grooves and the second one of the at least two circumferential grooves,
wherein the first and second planes are parallel to each other and to an equatorial plane of the tyre,
wherein the first and second planes delimit a continuous portion of at least one of the circumferential ribs,
wherein the continuous portion comprises a constant axial width,
wherein axially opposite ends of the at least one blind transverse cut of the first one of the at least two circumferential grooves are disposed on a straight line,
wherein the straight line is perpendicular to the equatorial plane of the tyre,
wherein the first one of the at least two circumferential grooves and the second one of the at least two circumferential grooves comprise rectilinear portions,
wherein a circumferential extension of the at least one blind transverse cut comprises one of the rectilinear portions of a corresponding one of the at least two circumferential grooves,
wherein the rectilinear portion is oriented in one of the different directions,
wherein an axis of the at least one blind transverse cut comprises a broken line segment with three parts,
wherein the three parts comprise a central part and two end parts, and
wherein the rectilinear portion comprises the central part.

28. The tyre of claim 27, wherein each of the at least two circumferential grooves further comprises, within a single pitch, a first pair and a second pair of substantially rectilinear portions.

29. A tyre for a wheel of a vehicle, comprising:
a carcass;
a belt structure; and
a tread;
wherein the carcass comprises a central crown portion and two axially opposite sides comprising beads for mounting the tyre on a corresponding rim of a wheel,
wherein the belt structure is coaxially associated with the carcass,
wherein the tread extends coaxially around the belt structure,
wherein the tread comprises a pattern, comprising:
at least two circumferential grooves; and
at least three circumferential ribs;
wherein each of the at least two circumferential grooves comprises a zigzag configuration,
wherein the at least three circumferential ribs comprise at least one central rib and two shoulder ribs,
wherein each of the at least two circumferential grooves further comprises a shape that is repeated identically according to a predetermined circumferential pitch,
wherein each of the at least two circumferential grooves further comprises, within the single pitch, at least one blind transverse cut intersecting said each of the at least two circumferential grooves and extending from opposite sides of said each of the at least two circumferential grooves,
wherein each of the at least two circumferential grooves further comprises, within the single pitch, first, second, and third changes in direction, at least two of the first, second, and third changes in direction being disposed outside of said at least one blind transverse cut with respect to a circumferential direction of the tread, and each change in direction being different from a circumferential direction of the tyre,
wherein at least two different directions associated with at least one of the first, second, and third changes in direction generate at least two ground-gripping fronts in each of two rotation directions of the tyre, wherein the at least one blind transverse cut generates a third ground-gripping front in each of the two rotation directions of the tyre, wherein a first end of at least one blind transverse cut of a first one of the at least two circumferential grooves is positioned on a first plane between the first one of the at least two circumferential grooves and an adjacent second one of the at least two circumferential grooves, wherein an end of at least one blind transverse cut of the second one of the at least two circumferential grooves is positioned on a second plane between the first one of the at least two circumferential grooves and the second one of the at least two circumferential grooves, wherein the first and second planes are parallel to each other and to an equatorial plane of the tyre, wherein the first and second planes delimit a continuous portion of at least one of the circumferential ribs, wherein the continuous portion comprises a constant axial width, wherein axially opposite ends of the at least one blind transverse cut of the first one of the at least two circumferential grooves are disposed on a straight line, wherein the straight line is perpendicular to the equatorial plane of the tyre, wherein the axially opposite ends of the at least one blind transverse cut each define an axis, and the straight line intersects the axially opposite ends of the at least one blind transverse cut at end points of the axes of the axially opposite ends, wherein the first one of the at least two circumferential grooves and the second one of the at least two circumferential grooves comprise rectilinear portions, wherein a circumferential extension of the at least one blind transverse cut comprises one of the rectilinear portions of a corresponding one of the at least two circumferential grooves, wherein the rectilinear portion is oriented in one of the different directions, wherein an axis of the at least one blind transverse cut comprises a broken line segment with three parts, wherein the three parts comprise a central part and two end parts, and wherein the rectilinear portion comprises the central part.

* * * * *